United States Patent

[11] 3,630,174

[72] Inventors Robert S. Runkle
Allendale, N.J.;
Robert Claude Marsh, Albuquerque, N. Mex.
[21] Appl. No. 801,652
[22] Filed Feb. 24, 1969
[45] Patented Dec. 28, 1971
[73] Assignee Becton, Dickinson and Company
East Rutherford, N.J.

[54] UNIT FOR PROVIDING ENVIRONMENTAL CONTROL OF ANIMALS
4 Claims, 3 Drawing Figs.
[52] U.S. Cl. ................................................ 119/15,
98/40, 119/30, 119/37, 236/115
[51] Int. Cl. .............................................. A01k 1/00
[50] Field of Search ........................................... 236/115;
98/40; 62/419, 309; 119/15, 37, 17, 18, 30

[56] References Cited
UNITED STATES PATENTS
2,162,923  6/1939  Short................................ 98/40
2,281,339  4/1942  Taggart........................... 119/37
2,352,398  6/1944  Markey........................... 119/37
3,734,444  2/1956  Lunn, Jr. et al................. 98/40 X
3,220,383  11/1965 Bruner............................ 119/17
3,237,599  3/1966  Torrey et al.................... 119/19
3,396,703  8/1968  Trussell.......................... 119/30
3,426,512  2/1969  Nesher............................ 98/115
3,429,297  2/1969  Schroer.......................... 119/17
3,464,388  9/1969  Stout.............................. 119/15
3,498,032  3/1970  Scott.............................. 98/115

Primary Examiner—Aldrich F. Medbery
Attorney—Kane, Dalsimer, Kane, Sullivan & Kurucz ABSTRACT: A housing unit for providing environmental control of animals which subjects confined animals to a uniform laminar airflow. Airborne cross-contamination from adjacent confined animals is prevented by means of unidirectional airflow and by baffles, which inhibit the formation of undesired turbulences and eddys and prevent passage of heavy particulate matter from adjoining cages.

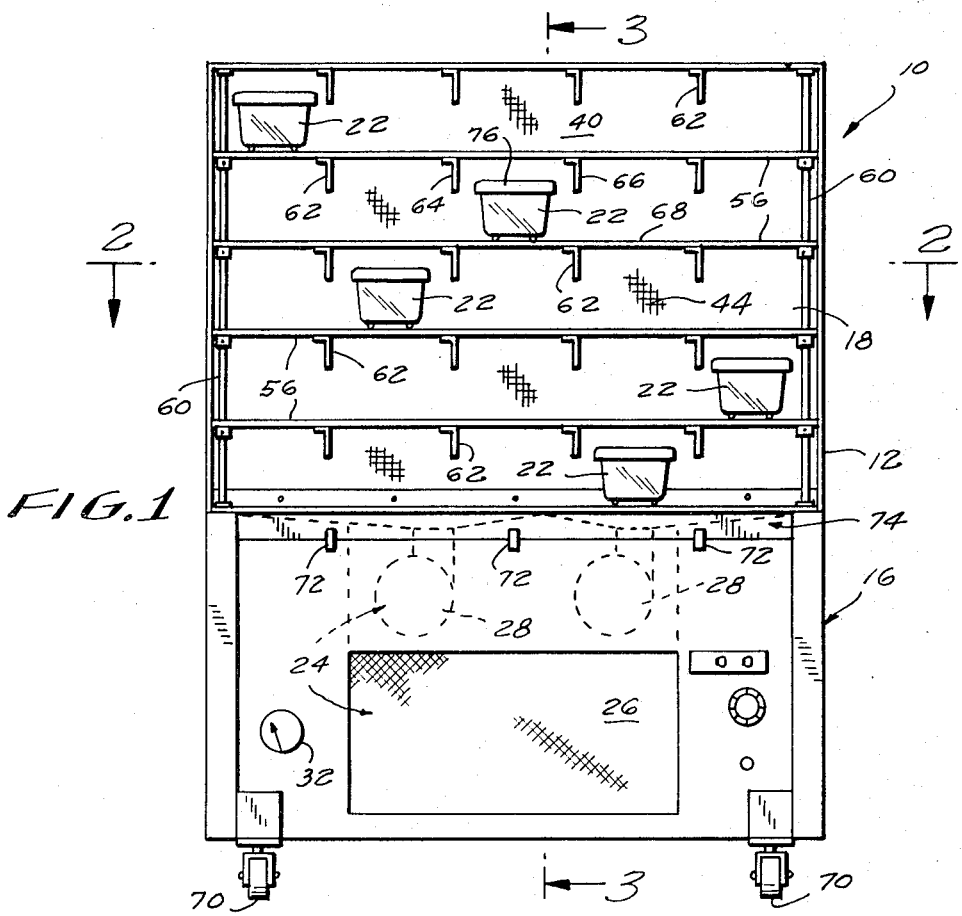
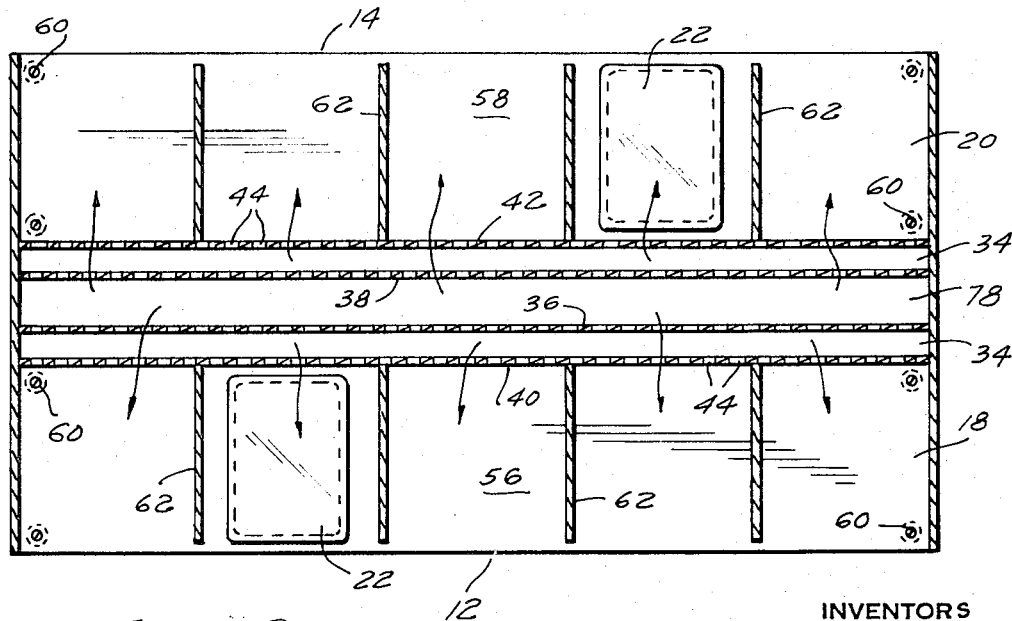

UNIT FOR PROVIDING ENVIRONMENTAL CONTROL OF ANIMALS

BACKGROUND OF THE INVENTION

This invention relates to a unit for providing controlled environmental conditions applicable to laboratory and research purposes. In particular, it relates to a unit for maintaining a selected environment in which to house, handle and rear animals.

Heretofore, laboratory animals, in large or small quantities have been contained in various units which inevitably possessed inherent disadvantages such as inefficient utilization of space, restriction in handling particular animals and difficulty in assuring and maintaining pathogen-free (or virus defined) conditions. In particular, the utilization of barrier-raised animals, such as specific pathogen free, virus-defined, and deprived (stressed) animals, has been a difficult and time-consuming task. For example, specifically defined animals have been raised under totally isolated conditions, using jacket-type isolators and conventional glove boxtype isolators. Unfortunately, these isolators have proven unsatisfactory as they tend to unduly restrict personnel during their operation, are immobile, and subject to cross-contamination.

It has been proposed to employ a kind of makeshift environmental control by using filter-protected cages to maintain defined animals and employing laminar flow workbenches for manipulating, changing, feeding and examining said defined animal. However, there are certain drawbacks to this concept. First, the use of filter protection such as a filter cap for cages, adds significantly to the labor factor, since the filter cap must be partially removed each time the animal is to be fed or watered, or completely removed when the animal is to be examined. This also means that any time manipulation, such as those mentioned above, is desired, the cage rack and/or cage must be carried to the laminar flow workbench for protection against cross-contamination. Second, regardless of the number of animals involved in a particular experiment, it will be necessary to provide a laminar flow workbench for each holding the defined animals. Finally, this system is ineffective to protect those animals highly susceptable to infections, such as those animals whose normal host defense mechanism has been impaired. Heretofore, it has been necessary to maintain such animals entirely behind a barrier system, such as the above described germ-free isolators and the like.

Accordingly, there is an urgent need for a system which will provide environmental control for specifically defined animals free of defects and deficiencies of the prior art.

SUMMARY OF THE INVENTION

It is, therefore, a principal object of this invention to provide a fully integrated unit for controlling the environment of specifically defined animals.

It is another object of this invention to eliminate a serious disadvantage of the prior art units by providing a unit to prevent cross-contamination of specifically defined animals, such as pathogen-free or virus-defined animals or animals highly susceptible to infection.

It is a further object to provide a mobile unit for isolating specifically defined animals.

It is a still further object to provide a unit for maintaining animals under defined conditions, while permitting convenient manipulation, changing, feeding, and examination of the defined animal.

Accordingly, the above and other objects of the invention are achieved by a housing unit for maintaining confined animals under controlled environmental conditions employing a conditioned uniform laminar airflow to isolate the animals from uncontrolled external environment, and to prevent cross-contamination between confined animals. As the name implies, the housing unit is capable of creating and maintaining a preselected, controlled environment, thereby rendering it possible to house, feed, change, manipulate, and examine, specifically defined animals, while minimizing the danger of cross-contamination. For such purposes, an adjustable shelf or shelf-rack assembly capable of supporting animal cages, trays, baskets, and other animal confining means is mounted in an open face of the housing unit and a conditioned uniform laminar flow of air is directed across the individual animal cages. In order to minimize cross-contamination, baffles are provided to separate the individual cages.

At least one, and usually two or more open faces are provided in each housing unit for mounting shelf racks. In this manner, it is possible to subject relatively large numbers of test animals to identical environmental conditions. For instance, virus-defined animals may be confined in close association with specific pathogen-free animals in order to contrast their reactions. Moreover, test animals which have been defined with different viruses can be housed and compared in close association, without danger of cross-contamination. Also, the housing unit can be portable, having a wholly integrated laminar air distribution system and animal storage means mounted therein.

Further objects and advantages will become apparent from the following detailed description which is to be taken in conjunction with the accompanying drawings illustrating a preferred embodiment of this invention in which:

FIG. 1 is a front elevational view of a housing unit incorporating the teachings of this invention employing adjustable shelf racks and casters. The trays associated with the shelf racks are present for illustrative purposes only;

FIG. 2 is a horizontal sectional view of a housing unit of this invention taken along a plane corresponding to line 2—2 of FIG. 1.

Figure 3:
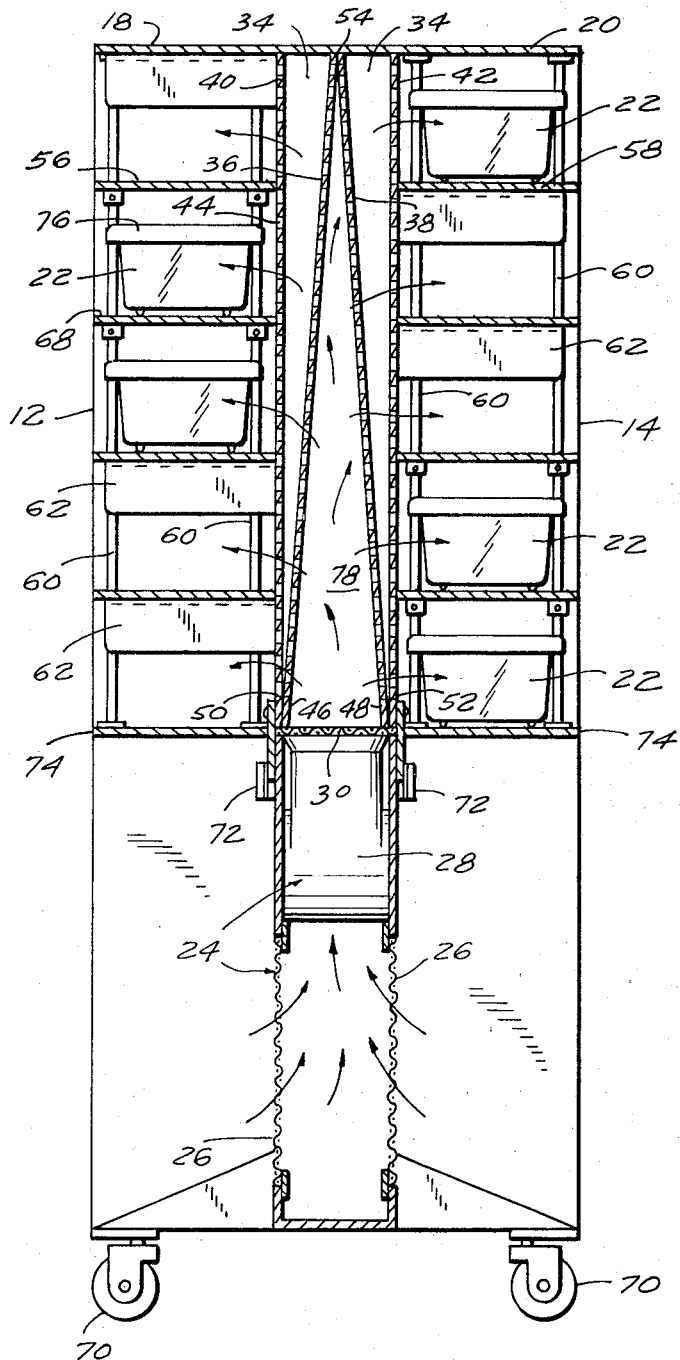
FIG. 3 is a longitudinal sectional view of a housing unit taken along a plane corresponding to line 3—3 of FIG. 1.

In the drawings housing unit 10 is illustrated with open faces 12 and 14, which are each adapted to direct a uniform flow of laminar air outwardly. If desired, the housing unit illustrated may be adapted as to have one face or more than one face for storing animals.

Housing unit 10 comprises a support structure 16, said structure defining peripheries 18 and 20 about each open face. The support structure 16 is preferably of sufficient structural strength and of material capable of resisting the contemplated loads, degradation, and corrosive action to which it would ordinarily be exposed. For such purposes, a suitable stainless steel, or other metal, a suitable plastic or organic resin may be employed.

An optimum number of animal confining means 22, such as trays or cages and, consequently, animals, may be contained within the unit by efficiently utilizing the available air space and by the incorporation of a preselected airflow rate and characteristic. It should be understood that the animal housing capacity of any particular cage, tray, or storing area is not limited and will vary depending upon the conditions and rapidity at which the air is circulated through the unit.

As seen in FIG. 3, air is introduced into he unit by means of a filtered air supply system 24 associated with the support structure 16. In a preferred embodiment the filtered air supply system is mounted within the housing unit. The system comprises a roughing filter air intake 26 and blowers 28 mounted downstream of said air intake. Generally the blowers should have sufficient capacity to generate an airflow having a velocity in the range of from about 60 to 120 feet per minute, as measured around a fully loaded shelf rack. The roughing filter air intake is a perforated prefilter. It should be understood that the instant invention also contemplates the inclusion of a suitable air temperature control unit which may embrace a heater as well as a cooler associated with the blower means in order to assist in environmental control.

In order to condition the airflow as generated by blowers 28, and remove micro-organisms and the like, present in the airflow and associated with airborne dust particles, a high efficiency particulate air (HEPA) filter 30 is employed. It should be noted that passing air through an HEPA filter is usually sufficient to remove indigenous contamination, both physical and biological, such that a germ-free flow of air is produced. The HEPA filter is of a corrugated design, capable of removing airborne particles of a size greater than about 0.3 microns. Housing unit 10 is equipped with a magnahelic gauge 32 for determining the loading of the HEPA filter 30 in order to indicate when replacement of said filter is necessary.

Referring again to the drawing, there is provided a system for converting the highly filtered airflow to a laminar flow and for directing the laminar flow in a predetermined path across an open face of the unit. The system as shown comprises air plenum 34 for distributing an airflow to the vicinity of a tandem pair of screens, inner screens 36 and 38 and outer screens 40 and 42. Preferably, there is an inner screen and outer screen associated with each face of the housing unit.

Outer screens 40 and 42 are framed by peripheries 18 and 20 of housing unit 10 and define open faces 12 and 14. The screens are adapted to direct a uniform laminar flow outwardly across said peripheries. Preferably the outer screens can be perforated, a major portion of the screens being a solid area and a minor portion of the screens being an open area. Each screen may have from about 5 to 10 percent open area, comprising a series of staggered holes 44, each hole about 0.05 inch in diameter. Generally aluminum inner and outer screens have proven satisfactory, though other metal or plastic screens can be substituted. A workable screen arrangement, comprises a punched aluminum screen, having 7½ percent open area, of the type having about 39 holes per square inch on 11/64 inch centers. Other screens adapted to laminar flow conversions may be employed in place of the above-described punched screen.

Inner screens 36 and 38 are positioned upstream of said airflow from said outer screens. The inner screens are also perforated screens having similar construction to the outer screens. A workable inner screen design comprises a punched aluminum screen having 28 percent open area, having 169 staggered holes per square inch, each hole having a diameter of 0.045 inches. Bases 46 and 48 of the inner screens form an acute angle with the bases 50 and 52 of the outer screens. In the illustrated unit having two open faces and a pair of inner and outer screens associated with each face, best results are attained when the inner screens meet in the center 54 of the air plenum 34 and extend at acute angles from the bases 50 and 52 of outer screens 40 and 42. In employing this tentlike arrangement of inner screens, which form secondary air plenum 78, in conjunction with the substantially vertically disposed outer screens, it has been found that an essentially uniform laminar flow is generated and directed outwardly from each open face.

Means are provided for positioning confined animals in the path of the laminar flow. As illustrated in the drawings, shelf racks 56 and 58 are positioned horizontally in each open face. The shelf racks may be adjustable and, as shown in the accompanying drawings, are supported by vertical columns 60 extending from the top to the bottom of each periphery. Alternatively, for example, the racks 56 and 58 can be supported by pegs inserted into the outer screens 40 and 42. The shelves may be adapted to be removable to simplify cleaning operations.

Means for isolating adjoining confined animals to prevent cross-contamination are provided. In the accompanying drawings said means are shown as baffles 62 which are spaced above each shelf rack. Generally at least one pair of substantially parallel spaced baffle plates 64 and 66 are vertically disposed above a shelf 68 and extend outwardly from each periphery, 18, 20, parallel to the laminar flow. The baffles are horizontally adjustable by conventional means not shown so as to be adapted to receive animal trays or cages of various sizes and shapes thereunder, and to maintain these cages free of cross-contamination from adjacent or surrounding cages, particularly heavy particle cross-contamination.

As explained heretofore, the unit can be wholly integrated. In order to achieve the maximum benefit from housing unit 10, means adapted to render the housing unit portable are affixed to the support structure 16. As seen in the drawings, these means can be casters 70, or resilient wheels, rollers, and the like. In order to permit easy cleaning of the housing unit, clamps 72 are provided to permit the entire top portion 74 of the housing unit to be removed and to permit maintenance of said HEPA filter.

In operation a switch (not shown) starts blower 28. The blowers 28 draw air through roughing filter air intake 26 and force air through the high efficiency particulate air filter 30 into air plenum 34. The airflow passes through inner screens 36 and 38 where the airflow is directed normal to outer screens 40 and 42. Thus, it can be seen that said inner screens perform various functions, such as equalizing the static pressure within air plenum 34 and turning the airflow from said HEPA filter, normal to the outer screens. Said outer screens deliver the air at a uniform velocity and direction, as a laminar flow, across shelf racks 56 and 58 and about trays 34 before passing out of peripheries 18 and 20.

Shelf racks 56 and 58 are adjusted such that vertical baffles 62 extend below the top lip of animal confining means 22 mounted on shelves 68 in order to reduce cross-contamination. Enhanced reduction of cross-contamination is achieved and accordingly it is preferred that the vertical baffles extend from about 1 to about 1½ inches below the top lip 76 of confining means 22.

During operation of the unit animals may be handled, fed, and otherwise manipulated with minimal danger of cross-contamination and free of airborne particles containing micro-organisms from external uncontrolled environment. When examining animals or removing cages it is best to avoid violent movements which may interfere with laminar flow and/or induce cross-contamination.

It is within the scope of this invention to employ an externally mounted filter air supply means comprising for instance, a roughing air filter and a blower, both connected by hose arrangement or the like to a high efficiency particulate air filter, to supply air to air plenum 34.

Thus, among others, the several aforenoted objects and advantages are most effectively attained. Although a single, somewhat preferred embodiment of the invention has been disclosed and described in detail herein it should be understood that this invention is in no sense limited thereby and its scope is to be determined by that of the appended claims.

We claim:

1. An isolation unit for specifically defined animals adapted to permit ready access to said animals while maintaining the animals free from environmental contamination and from cross-contamination from adjacent confined animals comprising:
    a. a housing unit having an air inlet associated with the base portion of the unit, a longitudinally extending air plenum centrally disposed within the unit and connected at one end to said inlet and a pair of open animal confining stations spaced at opposite sides of the unit and communicating with the other end of said air plenum;
    b. airflow generating and filtering means connected to said unit for providing a contaminant-free flow of air through said plenum from the inside of the unit and exhausting outwardly of said unit at each of said animal confining stations;
    c. means spaced within said plenum for providing a uniform airflow in said plenum;
    d. means connected to the unit at each of said animal confining stations for receiving said uniform airflow and for generating a laminar flow passing from the inside to the outside of the unit; and
    e. baffle means spaced parallel to said laminar flow connected to said unit at each of said animal confining stations for preventing cross-contamination between confined animals.

2. The invention in accordance with claim 1 wherein means are provided to render said housing unit mobile.

3. The invention in accordance with claim 1 including a vertically adjustable storage rack mounted to said unit at each of said animal confining stations, each rack having a plurality of spaced-apart horizontally disposed shelves and a plurality of pairs of horizontally adjustable baffles spaced above each of said shelves and extending downwardly towards each of said shelves to prevent cross-contamination when animals are confined on said shelves.

4. The invention in accordance with claim 1 wherein said means for providing a uniform airflow in said plenum and said means for generating a laminar flow includes a pair of spaced outer perforated screens spaced within said air plenum, each of said outer screens forming a laminar flow-directing face and a pair of perforated inner screens disposed between said outer screens, wherein the bases of said respective inner screens form an acute angle with a bases of said respective outer screens and the tops of said inner screens and outer screens are in substantial alignment.

* * * * *